United States Patent [19]
Bergk

[11] Patent Number: 5,708,572
[45] Date of Patent: Jan. 13, 1998

[54] SWITCHED-MODE POWER SUPPLY

[75] Inventor: Günther Bergk, Niedernhausen, Germany

[73] Assignee: Braun Aktiengesellschaft, Kronberg, Germany

[21] Appl. No.: 615,306

[22] PCT Filed: Oct. 25, 1994

[86] PCT No.: PCT/EP94/03506

§ 371 Date: Mar. 15, 1996

§ 102(e) Date: Mar. 15, 1996

[87] PCT Pub. No.: WO95/12840

PCT Pub. Date: May 11, 1995

[30] Foreign Application Priority Data

Nov. 3, 1993 [DE] Germany .............. 43 37 461.1

[51] Int. Cl.$^6$ ............................................. H02M 3/335
[52] U.S. Cl. ........................... 363/21; 363/97; 363/131
[58] Field of Search ............................. 363/19, 21, 97, 363/131, 89, 16

[56] References Cited

U.S. PATENT DOCUMENTS

| | | | |
|---|---|---|---|
| 4,523,139 | 6/1985 | Schwarz et al. | 320/40 |
| 4,684,871 | 8/1987 | Plagge | 320/21 |
| 4,969,077 | 11/1990 | Plagge | 363/19 |
| 5,101,334 | 3/1992 | Plagge et al. | 363/19 |

FOREIGN PATENT DOCUMENTS

| | | |
|---|---|---|
| A 0 162 341 | 11/1985 | European Pat. Off. |
| A 0 226 128 | 6/1987 | European Pat. Off. |
| A 0 383 382 | 8/1990 | European Pat. Off. |
| A 0 525 898 | 2/1993 | European Pat. Off. |
| G 8809723 U | 1/1989 | Germany |
| WO A 91 15053 | 10/1991 | WIPO |

*Primary Examiner*—Peter S. Wong
*Assistant Examiner*—Shawn Riley
*Attorney, Agent, or Firm*—Fish & Richardson P.C.

[57] ABSTRACT

The invention is directed to a switched-mode power supply with a primary switched-mode flyback converter for the controlled supply of an electrical load from an input voltage source of optionally different voltage types and voltage levels, in which a series arrangement comprising of the primary winding of a transformer, the main current path of a a first controllable semiconductor switching device, and a first resistor is connected in parallel with the input voltage source. The secondary winding of the transformer is connected in series with a diode and the load. The base of the first controllable semiconductor switching device is connected to an arrangement that limits the maximum peak current of the first controllable semiconductor switching device in dependence upon the output current and that detects the voltage drop caused by the output current through the secondary winding along the internal impedance of the secondary winding of the transformer.

15 Claims, 3 Drawing Sheets

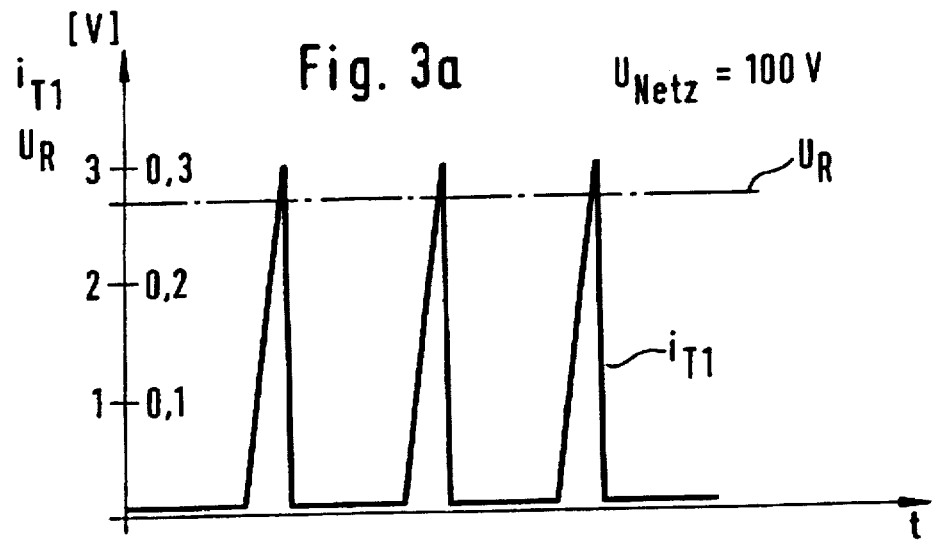
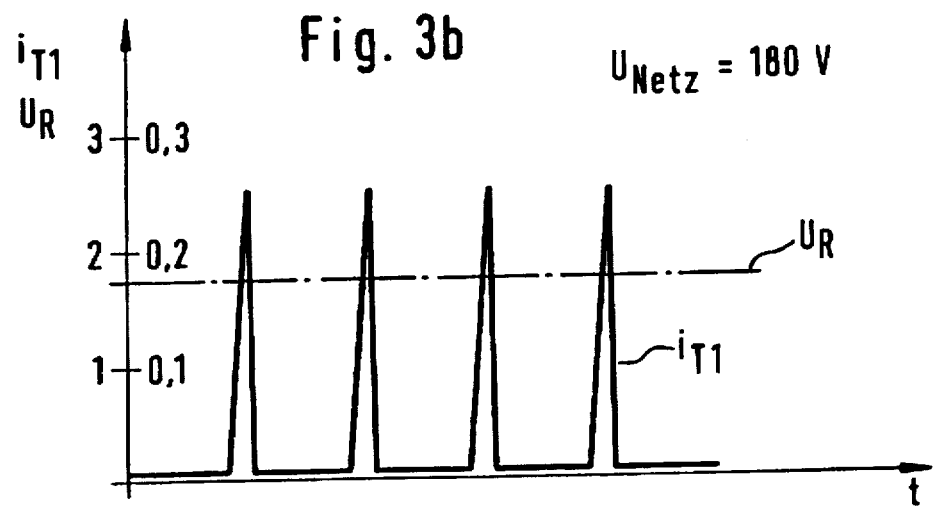
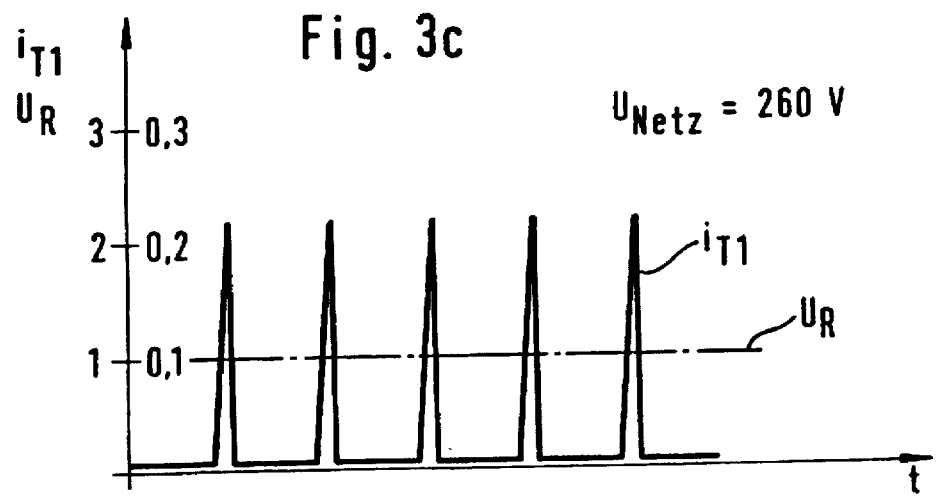

5,708,572

SWITCHED-MODE POWER SUPPLY

BACKGROUND

This invention relates to a switched-mode power supply.

In switched-mode power supplies of this type, the mean value of the output current flowing through the load increases at a higher input voltage. This current rise amounts to about 50% with an increase in the input voltage from 100 V to 300 V and is primarily caused by the storage period of the first controllable semiconductor operating as a switching device in the saturated state, which storage period increases in effect in the presence of a higher input voltage, that is, it increases in proportion to the turn-on period.

In order to counteract this undesired current rise, current controls are known in which the current is measured through a voltage drop over a resistance and utilized as a controlled variable. Apart from requiring the arrangement of an additional component, these controls have the disadvantage that a voltage drop is produced in particular at relatively low output voltages by the insertion of the current sensing resistor.

SUMMARY

It is an object of the present invention to provide in a switched-mode power supply of the type initially referred to a simple and yet highly accurate and easily adjustable current control in which the need for an additional current sensing resistor is obviated.

According to the present invention, this object is accomplished in that the base of the first controllable semiconductor switching device is connected to an arrangement that limits the maximum peak current of the first controllable semiconductor switching device in dependence upon the output current and that detects the voltage drop caused by the output current through the secondary winding along the internal impedance of the secondary winding of the transformer.

The solution of the present invention enables the peak current of the controllable semiconductor switching device to be limited in dependence upon the output current in an accurately adjustable manner, utilizing for detection of the output current the internal impedance of the secondary winding as a current sensing resistance, thus eliminating the need for an additional current sensing resistor, omitting the voltage drop produced by such a current sensing resistor.

Further, by utilizing the internal impedance of the secondary winding as a current sensing resistance, the output current is reduced at elevated temperatures due to the positive temperature coefficient of the copper of the transformer winding, if no additional temperature compensation is performed. It is another advantage of the solution of the present invention that the winding temperature can be detected during operation of the switched-mode power supply by means of the temperature responsive internal impedance of the secondary winding of the transformer, enabling such temperature to be referred to for effecting protective and cut-off measures.

An advantageous feature of the solution of the present invention is characterized in that the arrangement limiting the maximum peak current of the first controllable semiconductor switching device performs such limitation in dependence upon the mean output current, comparing the voltage drop caused by the output current through the secondary winding along the internal impedance of the secondary winding of the transformer with a reference voltage that corresponds to the maximum output current.

The limiting of the peak current of the first controllable semiconductor switching device by detection of the mean output current considers the turn-on and turn-off relationships of the controllable semiconductor switching device, thus enabling a correct measure of the output current to be determined also during prolonged pauses of the controllable semiconductor switching device. The comparison of the voltage drop detected along the internal impedance of the secondary winding of the transformer with a reference voltage enables the permissible peak current to be easily adjusted in dependence upon the components employed.

A further advantageous feature of the solution of the present invention is characterized in that the arrangement limiting the maximum peak current of the first controllable semiconductor switching device includes an operational amplifier operating as an integrator and having applied to its inputs the voltage drop along the internal impedance of the secondary winding of the transformer, while its output is connected to the base of the first controllable semiconductor switching device.

The arrangement of an operational amplifier operating as an integrator provides an easy way of obtaining the mean value of the output current over several cycles, so that in a comparison of the voltage drop along the internal impedance of the secondary winding of the transformer, as applied to the one input of the operational amplifier, with a reference voltage present at the other input of the operational amplifier, a representative value for the permissible output current of the transformer is obtained which is referred to for limiting the peak current of the controllable semiconductor switching device.

The comparison between the voltage drop along the internal impedance of the secondary winding of the transformer and a predetermined reference voltage may be effected in that either the negative input of the operational amplifier is connected to a voltage divider in parallel arrangement with the diode, its divider junction being connected to the cathode of the diode via the one voltage-divider resistor, or alternatively, that the negative input of the operational amplifier is connected to reference potential through the series arrangement of two resistors, with the junction between the two resistors being connected, via a zener diode, to the one end of the secondary winding of the transformer.

The output of the operational amplifier may be connected to the base of the first controllable semiconductor switching device through a controllable threshold element, so that below a predetermined threshold value the arrangement limiting the peak current of the first controllable semiconductor switching device has no influence on the turning off of peak current below the predetermined reference value, operating on the turning off of the peak current of the first controllable semiconductor switching device not until after a predetermined threshold value is exceeded.

An additional zener diode may be arranged between the output of the operational amplifier and the controllable threshold element if the operating voltage of the operational amplifier is lower than the maximum voltage at the base of the first controllable semiconductor switching device during its turn-on period.

The peak current turn-off function of the first controllable semiconductor switching device can be influenced still further in that a second controllable semiconductor is provided having its collector-emitter path between the base of the first controllable semiconductor switching device and reference potential, while its base is connected to the emitter of the first controllable semiconductor switching device via a third zener diode, and to reference potential via a resistor.

Alternatively, a further feature of the present invention may provide a zener diode between the base of the first controllable semiconductor switching device and reference potential.

In addition to the circuit arrangements for limiting the peak current of the first controllable semiconductor switching device, a secondary-side feedback to the base of the first controllable semiconductor switching device may be accomplished by providing a series arrangement comprising a resistor and a capacitor which, on the secondary side, is connected to the end of the secondary winding, which end is connected to the cathode of the diode.

The idea underlying the present invention will be explained in greater detail in the following with reference to embodiments illustrated in the accompanying drawings. In the drawings,

BRIEF DESCRIPTION OF THE DRAWINGS

FIGS. 3a–c are a family of curves showing the current through the first controllable semiconductor switching device and the control voltage at the output of the operational amplifier at various input voltages, plotted against time, in the embodiment illustrated in FIG. 1.

DESCRIPTION

Figure 1:
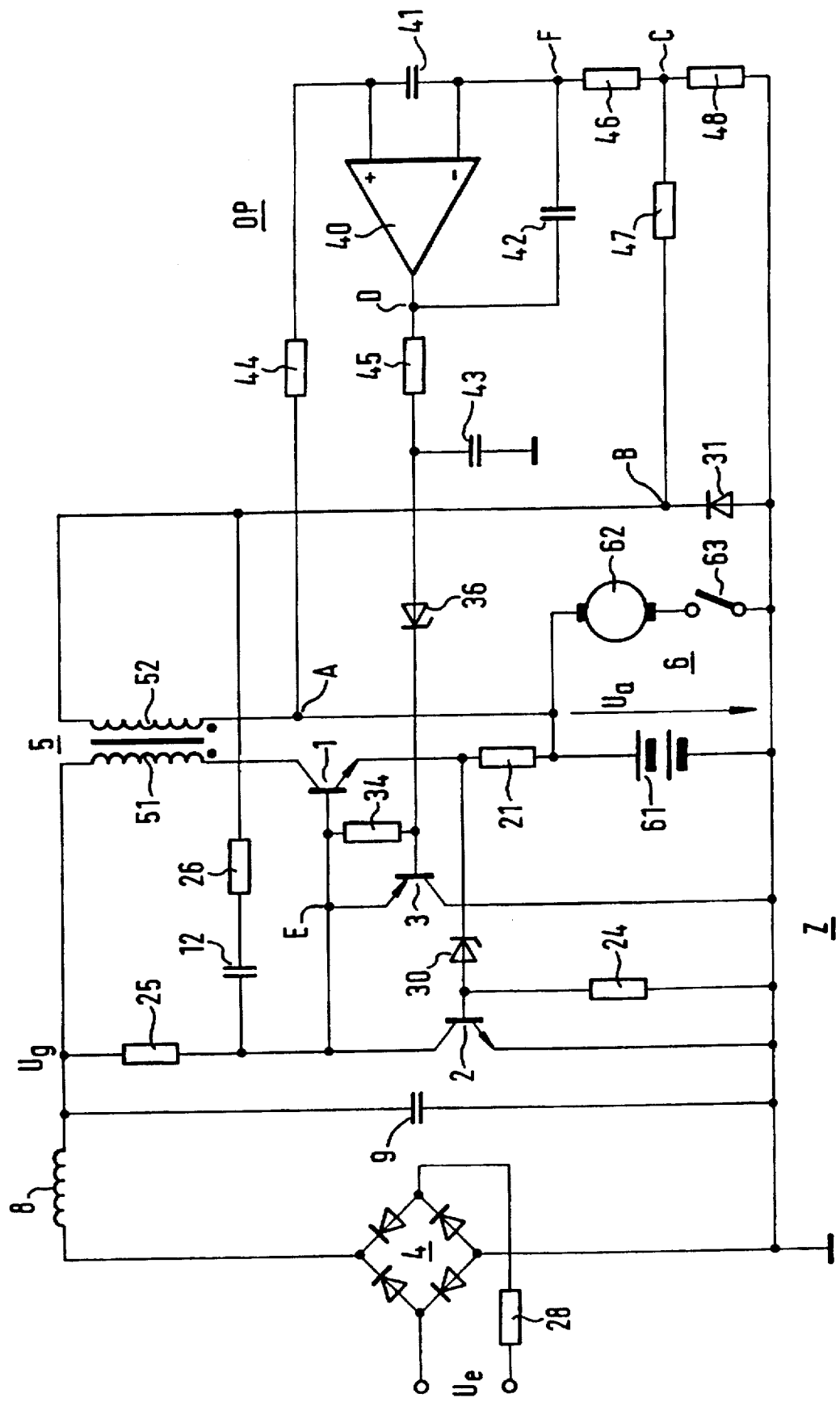
FIGS. 1 and 2 are electrical schematics illustrating different embodiments of switching-mode power supplies according to the present invention for controlling switched-mode power supplies.

The switched-mode power supply illustrated in FIG. 1 includes a primary switched-mode flyback converter with a transformer 5 and a first controllable semiconductor switching device 1 configured as a transistor, as well as a first diode 31 provided in the load circuit and of such polarity that the energy stored in the transformer 5 during the OFF period of the transistor 1 is discharged into the load 6 which in this embodiment is comprised of an accumulator 61 and a direct-current motor 62 connectible to the accumulator 61 by means of a switch 63. If the load is only a direct-current motor without accumulator, it is necessary to provide a capacitor in parallel arrangement with the motor for smoothing the output voltage.

The flyback converter is energized, through a bridge rectifier arrangement 4 and a resistor 28, from a DC or AC supply whose voltage may vary between 100 and 250 volts or, in the extreme, may also be 12 volts, and whose frequency may be nearly arbitrary where an AC supply is used. The rectified output voltage is applied to the input of the flyback converter or the electronic control and regulating means through a series choke 8 and a parallel capacitor 9.

The rectified voltage $U_g$ is applied to the series arrangement comprised of the primary winding 51 of the transformer 5, the collector-emitter path of the transistor 1, the resistor 21, and the load 6. The base of transistor 1 is connected, through a resistor 26 and a capacitor 12 connected in series, to the one terminal of the secondary winding 52 of the transformer 5, and, through a resistor 25, to the positive potential of the rectified voltage $U_g$. In addition, the base of transistor 1 is connected to ground or reference potential through the collector-emitter path of a transistor 2.

The emitter of transistor 1 is connected to ground or reference potential through the resistor 21 and the accumulator 61. The base of transistor 2 is connected to reference potential through a resistor 24, and to the emitter of transistor 1 through a zener diode 30. The zener diode 30 enables the switching threshold of transistor 2 to be defined.

The direction of winding of the primary and secondary 51 and 52, respectively, of the transformer 5 is identified by the dots shown in the Figures.

Referring further to FIG. 1, the positive input (+) of an operational amplifier 40 is connected, through a resistor 44, to the end A of the secondary winding 52 connected to the accumulator 61. Due to a capacitor 42 inserted between the negative (−) input (junction point F) of the operational amplifier 40 and its output D, the operational amplifier operates as an integrator. In addition, the negative input F is connected to reference potential through a voltage divider comprising of resistors 46 and 48, and the divider junction C is connected, through a resistor 47, to the end B of the secondary winding 52, which end is connected to the cathode of the diode 31.

The diode 31 has its anode connected to reference potential. To suppress interference, a capacitor 41 is inserted between the two inputs of the operational amplifier 40.

The output D of the operational amplifier 40 is connected, through a resistor 45 and a zener diode 36, to the input of a controllable zener diode Z comprising a transistor 3 and a resistor 34. The emitter-collector path of transistor 3 lies between the base E of the switching transistor 1 and reference potential. The base of transistor 3 forming the input of the controllable zener diode is connected, through the resistor 34, to its emitter and thus also to the base of transistor 1.

The zener diode 36 is only necessary if the voltage at the base of transistor 3 can exceed the operating voltage of the operational amplifier 40. Moreover, the end of resistor 45 remote from the output D of the operational amplifier is connected to reference potential through a capacitor 43 for smoothing the output signal of the operational amplifier.

Figure 2:
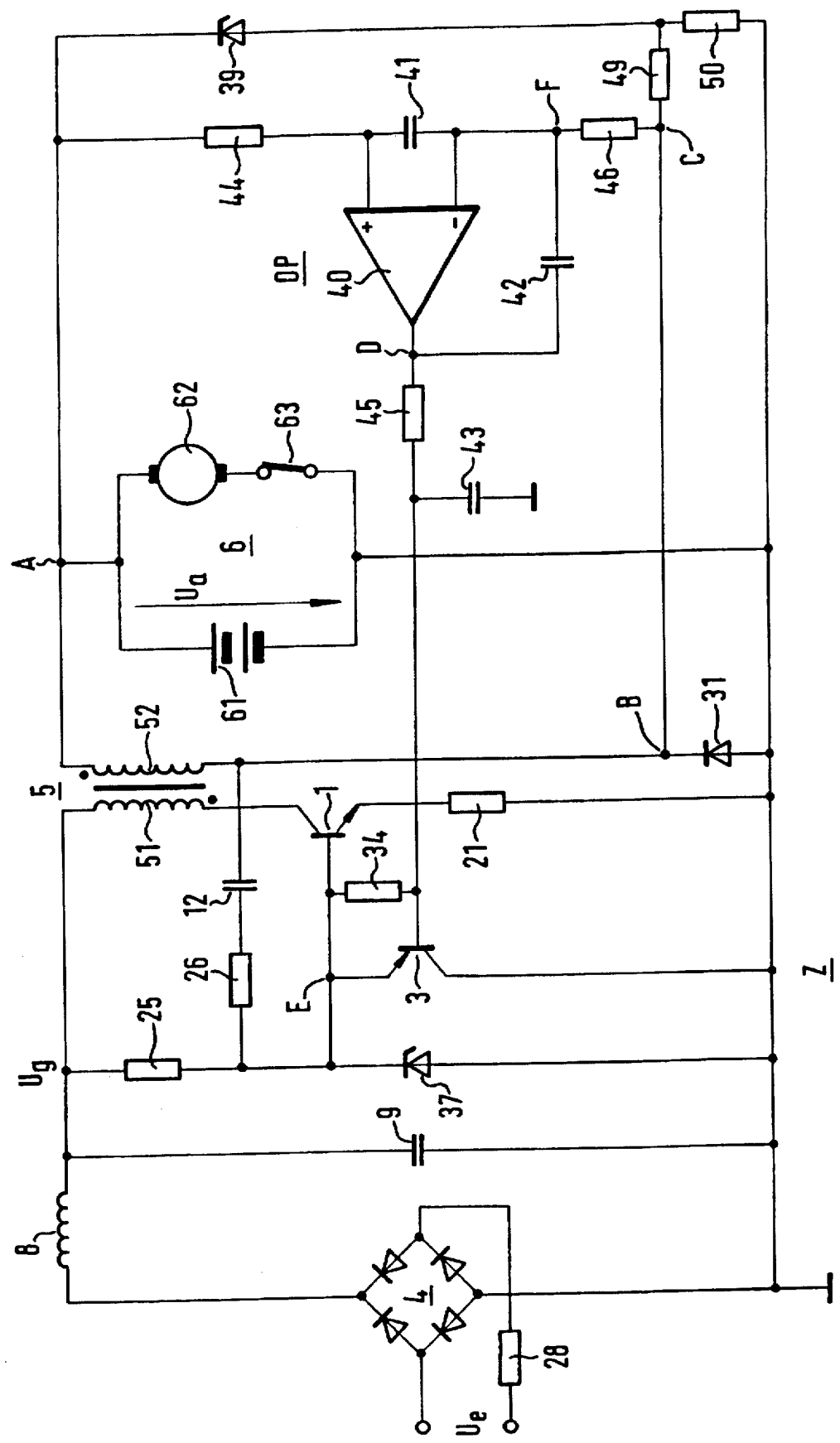

According to FIG. 2, the circuitry may also be configured such that the accumulator receives only the secondary current flowing through the secondary winding, rather than being also supplied with the primary current flowing through the primary winding, as in FIG. 1. As becomes apparent from FIG. 2, the resistor 21 is then directly connected to reference potential. In this embodiment, the cathode of a zener diode 39 is connected to the secondary winding 52, while its anode is connected to two resistors 49, 50 of which the one resistor 49 serving a potential lowering function is connected to resistor 46 and to the cathode of diode 31, while the other resistor 50 arranged to function as a stabilizer for the zener diode 39 is connected to reference potential.

The mode of operation of the electronic switched-mode power supply which is identical in FIGS. 1 and 2 will now be explained in greater detail with reference to FIG. 1 and the graphs illustrated in FIGS. 3a, 3b and 3c.

Following rectification of the dc or ac voltage $U_e$ present at the input of the bridge rectifier arrangement 4, the transistor 1 operating as a switching transistor is driven, through resistor 25, by a low base current as a result of which transistor 1 is placed in its conductive state. Through resistor 26 and capacitor 12, a feedback effect occurs via the secondary winding 52 of the transformer 5, causing transistor 1 to be driven additionally and rendering it fully conducting.

The collector current rises linearly, producing a voltage drop over resistor 21 which is proportional to the respective collector current. The voltage residing at the emitter of transistor 1 with respect to reference potential then corresponds in FIG. 1 to the voltage drop over resistor 21 plus the accumulator voltage $U_a$ representing the output voltage in this embodiment. When a specified peak voltage is attained, transistor 2 is driven through the zener diode 30, thereby going into conduction and connecting the base of transistor 1 to ground or reference potential, thus withdrawing base current from transistor 1, cutting transistor 1 off.

With the beginning of the OFF period of transistor 1, the polarity of the voltage induced in the secondary winding 52 of the transformer 5 reverses. The energy stored in the transformer 5 is then delivered to the accumulator through the diode 31, in accordance with the principle of a flyback converter.

During the discharge of the energy stored in the transformer 5 during the OFF period of transistor 1, it is essentially only the direct-current resistance of the secondary winding 52 of the transformer 5 that takes effect, so that this particular resistance can be referred to as the internal impedance of the transformer for measurement purposes. The current flowing through the secondary winding 52 of the transformer 5 produces along the internal impedance of the secondary winding 52, that is, between the junction points A and B, a voltage drop proportional to the current of the secondary winding.

This current-proportional voltage drop is applied to the inputs of the operational amplifier 40, with the positive input of the operational amplifier 40 being connected to junction point A through resistor 44, whereas the negative input of the operational amplifier 40 is connected to a negative reference voltage through resistor 46. In the embodiment of FIG. 1, the negative reference voltage is obtained from the voltage divider comprising resistors 47 and 48 to which the accumulator voltage is applied which is to be regarded as essentially constant.

If the internal impedance of the secondary winding 52 of the transformer 5 is 60 mΩ, approximately, and the reference voltage present at the junction point C of the voltage divider is 50 mV, approximately, this corresponds to a secondary winding output current of $$\frac{50\,mV}{60\,m\Omega} = 830\,mA$$

The operational amplifier 40 operating as an integrator, it thus detects the mean value of the output current of the secondary winding 52 of the transformer 5.

If the output current of the secondary winding 52 of the transformer 5 is lower than, or equal to, the corresponding value due to the reference voltage at the negative input of the operational amplifier 40, transistor 3 is maintained nonconductive, and the arrangement limiting the maximum peak current has no effect on the peak current turn-off function of the switching transistor.

On an increase in the output current of the secondary winding 52 of the transformer with a voltage at the junction point B that is more positive with respect to the voltage at the junction point A, the input of the operational amplifier is driven through resistors 46, 47. The output of the operational amplifier 40 becomes more negative, driving through the controllable zener diode the base of the switching transistor 1 which becomes equally more negative, thus preventing the voltage at the emitter resistor 21 from rising to too high a value, whereby the peak current of the switching transistor 1 is reduced.

The zener diode 36 connected in series with the transistor 3 of the controllable zener diode is only necessary if the operating voltage of the operational amplifier 40 is lower than the maximum voltage at the base of the switching transistor 1 during the ON period.

Therefore, the maximum peak current delivered by the secondary winding 52 is limited by an arrangement in which the base of the switching transistor 1 is maintained constant with respect to reference potential by a source of reference voltage that is rendered conducting from a specified voltage on.

FIGS. 3a to 3c illustrate the current flowing through transistor 1 as well as the control voltage residing at the output of the operational amplifier 40 in the presence of different input voltages of the flyback converter. FIG. 3a shows the relationships at an input voltage of 100 V, FIG. 3b at an input voltage of 180 V, and FIG. 3c at an input voltage of 260 V.

As becomes apparent from the graphs, the control voltage at the output of the operational amplifier 40 decreases with the input voltage increasing, and the peak value i of the transistor current i is correspondingly reduced by shortening the period during which it conducts. At a line voltage of $U_N$=100 V, the peak value of the current is about 300 mA with a control voltage of $U_R$=2.8 V (FIG. 3a), at a line voltage of $U_N$=180 V, the peak value of the current is about 250 mA with a control voltage of $U_R$=1.8 V (FIG. 3b), and at a line voltage of $U_N$=260 V, the peak value of the current is about 210 mA with a control voltage of $U_R$=1 V (FIG. 3c).

What is claimed is:

1. A switched-mode power supply for the controlled supply of an electrical load from an input source of optionally different voltage types and voltage levels, the switched mode power supply comprising a primary switched-mode flyback converter, said flyback converter comprising:

a transformer, having a primary and a secondary winding;

a first controllable semiconductor switching device, having a main current path and a base;

a first resistor; and a diode, said power supply further comprising a circuit arrangement for limiting during a flyback phase of operation a maximum current of the first controllable semiconductor switching device in dependence upon an output current in the secondary winding, said circuit arrangement connected to the first controllable switching device, and wherein the primary winding, the main current path of the first controllable semiconductor switching device, and the first resistor are connected in a first series arrangement, the first series arrangement being connected during operation in parallel with the input voltage source, and wherein the secondary winding and the diode are connected in a second series arrangment, the second series arrangement being connected during operation in series with the load, and wherein the circuit arrangement detects during the flyback phase a voltage drop along the internal impedance of the secondary winding caused by the output current.

2. The switched-mode power supply of claim 1, wherein said circuit arrangement limits the maximum peak current of the first controllable semiconductor switching device in dependance upon a mean output current by comparing the voltage drop along the internal impedance of the secondary winding caused by the output current during the flyback phase with a reference voltage that corresponds to the maximum output current.

3. The switched-mode power supply of claim 1 or claim 2, wherein said circuit arrangement includes an operational amplifier, having a positive input, a negative input, and an output connected to the base of the first controllable semiconductor switching device, said operational amplifier operating as an integrator, wherein during operation the voltage drop along the internal impedance of the secondary winding drives the inputs of the operational amplifier.

4. The switched-mode power supply of claim 3, further comprising:

a controllable threshold element having an input; and, a reference potential line, connected during operation to a reference potential;

wherein the secondary winding of the transformer further comprises a first end connected to the reference potential line and a second end connected during operation to the load;

wherein the negative input of the operational amplifier is connected to the reference potential line, the positive input of the operational amplifier is connected to the second end of the secondary winding, and the output of the operational amplifier is connected to the input of the controllable threshold element; and wherein the controllable threshold element is further connected between the base of the first controllable semiconductor switching device and the reference potential line.

5. The switched-mode power supply of claim 4, further comprising:

a voltage divider including a first and second voltage-divider resistor connected together at a common node;

wherein the negative input of the operational amplifier is connected to the common node of the voltage divider in parallel with the diode and a cathode of the diode is connected to the common node of the voltage-divider via the first voltage-divider resistor.

6. The switched-mode power supply of claim 4, further comprising:

a second resistor and a third resistor connected in a series arrangement with a shared junction therebetween; and a zener diode;

wherein the negative input of the operational amplifier is connected to the reference potential line through the series arrangement of the second and third resistors, and the shared junction between the second and third resistors is connected, via the zener diode to the second end of the secondary winding.

7. The switched-mode power supply of claim 5, further comprising:

a second and third resistor, wherein the positive input of the operational amplifier is connected to the second end of the secondary winding of the transformer through the second resistor, and that the negative input of the operational amplifier is connected to the the common node of the voltage-divider through the third resistor.

8. The switched-mode power supply of claim 4, wherein the controllable threshold element comprises:

a transistor having a base and an emitter-collector circuit, the base of the transistor forming the input of the controllable threshold element; and a second resistor, wherein the emitter-collector circuit of the transistor is connected between the base of the first controllable semiconductor switching device and the reference potential line, and the base of the transistor is connected, through the second resistor, to the base of the first controllable semiconductor switching device.

9. The switched-mode power supply of claim 4, further comprising:

a second resistor; and a capacitor having a first a second end wherein the first end of the capacitor is connected to the reference potential line;

wherein the output of the operational amplifier is connected to the second end of the capacitor and is further connected, through the second resistor, to the input of the controllable threshold element.

10. The switched-mode power supply of claim 9, further comprising:

a zener diode connected to the input of the controllable threshold element.

11. The switched-mode power supply of claim 1, further comprising:

a reference potential line connected during operation to a reference potential;

a zener diode; and a second resistor;

wherein the first controllable switching device further has an emitter; and wherein the circuit arrangement for limiting the maximum peak current of the first controllable semiconductor switching device includes a second controllable semiconductor device having a collector-emitter circuit and a base, wherein the collector-emitter circuit of the second controllable semiconductor device is connected between the base of the first controllable semiconductor switching device and the reference potential line, and the base of the second controllable semiconductor device is connected to the emitter of the first controllable semiconductor switching device via the zener diode and is also connected to the reference potential line via the second resistor.

12. The switched-mode power supply of claim 1, further comprising a reference potential line connected during operation to a reference potential, and wherein the circuit arrangement for limiting the maximum peak current of the first controllable semiconductor switching device comprises a zener diode connected between the base of the first controllable semiconductor switching device and the reference potential line.

13. The switched-mode power supply of claim 1, further comprising:

a feedback circuit having a first and second end, wherein the feedback circuit comprises a second resistor and a capacitor connected in series, wherein the feed back circuit is connected at the first end to the base of the first controllable semiconductor switching device and is connected at the second end to the first end of the secondary winding, wherein the first end of the secondary winding is further connected to a cathode of the diode.

14. The switched-mode power supply of claim 1, further comprising the load which includes an accumulator and a direct-current motor connected in parallel.

15. The switched-mode power supply of claim 1, wherein a current supplied to the load during operation includes a first current flowing through the secondary winding of the transformer and a second current flowing through the primary winding of the transformer.

* * * * *